United States Patent [19]
Webb

[11] Patent Number: 5,841,205
[45] Date of Patent: Nov. 24, 1998

[54] BRANCHING UNIT FOR UNDERWATER TELECOMMUNICATIONS SYSTEMS

[75] Inventor: Stephen Michael Webb, London, England

[73] Assignee: STC Submarine Systems Limited, Great Britain

[21] Appl. No.: 397,964

[22] Filed: Mar. 3, 1995

[30] Foreign Application Priority Data

Mar. 5, 1994 [GB] United Kingdom .................. 9404271
Mar. 10, 1994 [GB] United Kingdom .................. 9404631

[51] Int. Cl.⁶ ............................................... H04B 13/02
[52] U.S. Cl. ..................... 307/130; 307/125; 307/126; 307/113; 340/850; 340/870.39
[58] Field of Search ................................. 307/112, 125, 307/130, 131, 113, 120; 301/191; 340/870.39, 850

[56] References Cited

U.S. PATENT DOCUMENTS

| | | | |
|---|---|---|---|
| 4,096,466 | 6/1978 | Johnson | 340/5 |
| 4,641,372 | 2/1987 | Kelly et al. | 455/601 |
| 5,196,984 | 3/1993 | Webb | 361/191 |
| 5,489,897 | 2/1996 | Inoue | 340/870.39 |
| 5,491,368 | 2/1996 | Yamamoto | 307/113 |

*Primary Examiner*—William M. Shoop, Jr.
*Assistant Examiner*—Albert W. Paladini
*Attorney, Agent, or Firm*—Ware, Fressola, Van Der Sluys & Adolphson LLP

[57] ABSTRACT

A branching unit for an underwater communications system is arranged so as to provide remote hot switching for electrical power. The unit has three terminations (1, 2, 3) each for a different one of three line cables and one or more power demand circuits (20) requiring an electrical power feed from the line cables. A first switch is actuable to complete a current path between an appropriate pair of the three terminations via one or more of the power demand circuits depending upon relative line voltage. A second switch is actuable after actuation of the first switch depending upon current supplied to the power demand circuit(s) rising above that which occurs upon action of the first switch. The second switch completes a circuit between the non-paired termination and a fourth termination for a sea-earth.

12 Claims, 4 Drawing Sheets

BRANCHING UNIT FOR UNDERWATER TELECOMMUNICATIONS SYSTEMS

TECHNICAL FIELD

This invention relates to branching units for underwater telecommunications systems.

BACKGROUND OF THE INVENTION

Underwater cable systems originally were such as to connect two land terminals which were, for example, on opposite sides of the Atlantic ocean. A later development involved having two land terminals on one side and a third on the other side, there being a trunk cable (current supply cable) extending between the third land terminal and a branching unit (y interconnect) and spur cables extending from the branching unit to the two other terminals. Repeaters may be disposed in the trunk cable and the spur cables and power feed provision must thus be made. The repeaters can be powered by supplying current between the land terminal (terminal station) at one end of a branch (trunk or spur) cable and a distant earth (single end feeding) or between any two terminal stations (double and feeding). One known type of branching unit power feed of repeaters in the trunk cable and one spur cable is by double end feeding, whereas that of repeaters in the other spur cable is by single end feeding, the earth being provided by a sea earth integral with the branching unit. The branching unit may include relays by means of which the power feeding can be changed (switched) in the event of fault conditions in one of the branches, in order to isolate that branch whilst continuing to power the other branches.

Optical fibre underwater cable systems for long haul applications are now being designed with many landing points, and thus many branching units, and complicated traffic routing requirements. A basic branching unit suitable for multiple branching unit systems is disclosed in GB Published Patent Application No. 2252686A. This basic unit is however a passive unit, i.e. it does not involve repeaters/generators for the optical signals, which is designed to terminate three line cables and also to provide a sea earth for power feeding. A subsequent active design includes optical repeaters (regenerators) which require power feeding, as disclosed in GB Patent Application No. 9304328.9 in which there is a facility to power auxiliary circuitry, such as repeaters, in view of a zener diode chain and a full wave rectifier bridge.

A particular problem that has been experienced with active branching units is that of "hot" switching during power-up of the system. The active unit described in GB application No. 9304328.9 addresses this problem by providing an auxiliary switching relay which performs the hot switching, thus preventing damage to the main relays. The present invention can be utilized in the detailed circuits of that application, the whole contents of which are incorporated herein by reference.

SUMMARY OF THE INVENTION

The present invention is concerned with an alternative approach to this problem.

According to one aspect of the invention there is provided a branching unit for an underwater communications system, the unit being so arranged as to provide remote hot switching for electrical power.

According to another aspect of the invention there is provided an undersea communications system incorporating one or more switching units and shore stations associated therewith, wherein means are provided for performing hot switching within the shore stations.

The branching unit may comprise three terminations each for a different one of three line cables, one or more power demand circuits requiring an electrical power feed from the line cables, a first switching circuit actuable to complete a current path between an appropriate pair of the three terminations, via said one or more power demand circuits, based upon relative line voltage, and a second switching circuit actuable after actuation of said first switching circuit based upon current supplied to the power demand circuit(s) rising above that which occurs upon actuation of said first switching circuit and effective to complete a circuit between the non-paired termination(s) and a fourth termination for a sea earth.

The first switching circuit may comprise three electrical relays each having an operating coil and a normally closed pair of contacts arranged in series and forming one side of a delta network, each side of the delta network being connected between a different pair of the three terminations, each relay also having a pair of change-over contacts which normally connect a different one of the terminations to the delta network, but which when actuated, permit connection of the terminations to the fourth termination via the second switching circuit.

The second switching circuit may comprise a relay, the coil of which is connected in series with the power demand circuit(s).

BRIEF DESCRIPTION OF THE DRAWINGS

In order that the invention and its various other preferred features may be understood more easily, some embodiments will now be described, by way of example only, with reference to the accompanying drawings in which.

BEST MODE FOR CARRYING OUT THE INVENTION

Figure 1:
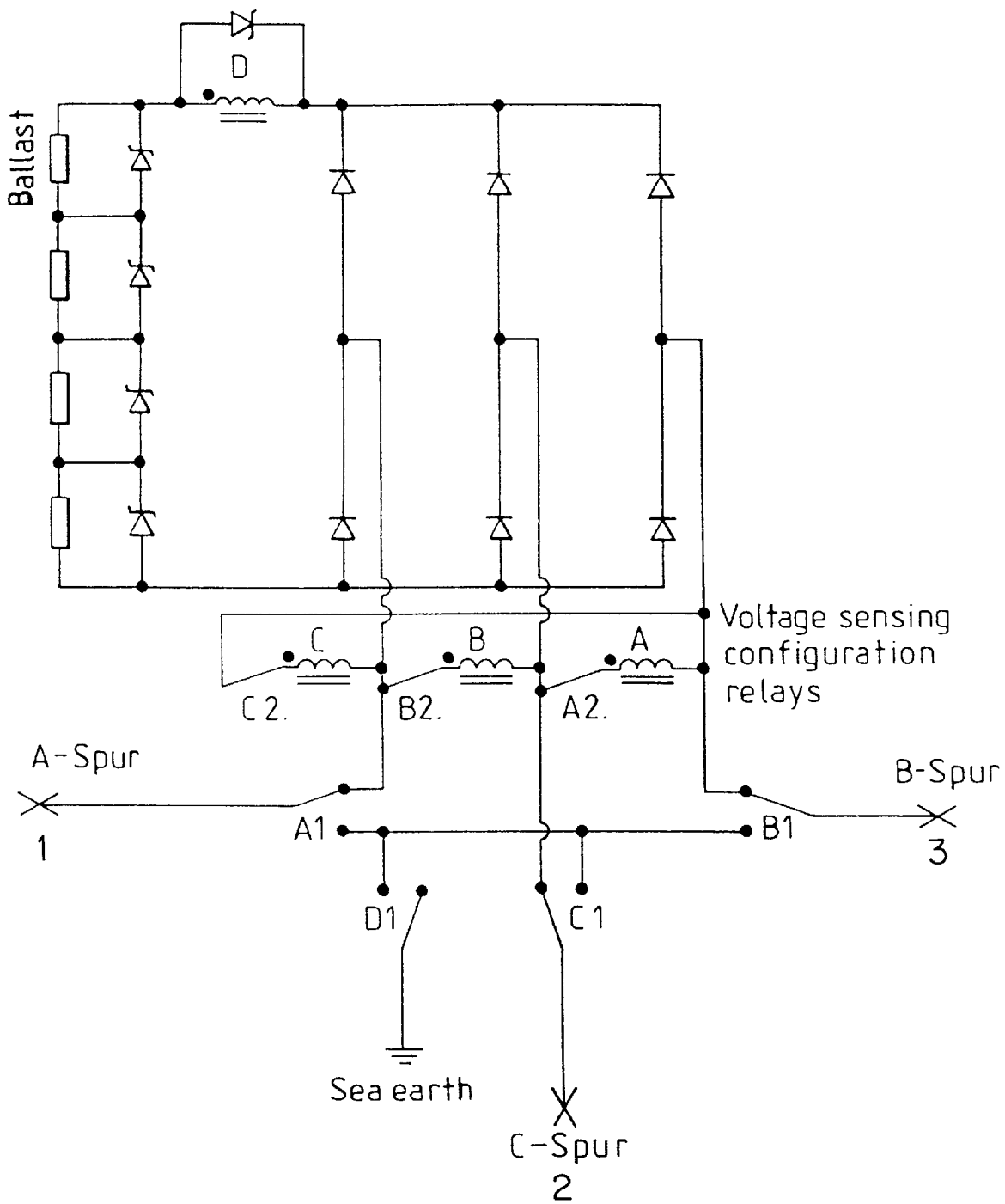
FIG. 1 is a simplified circuit diagram of a branching unit provided with remote hot switching.

Referring to the drawings, the branching unit is arranged to go through the power-up procedure with no hot switching. This is achieved by a two stage switching scheme, the two stages being performed each at a predetermined current level as the current rises during power-up.

Figure 2:
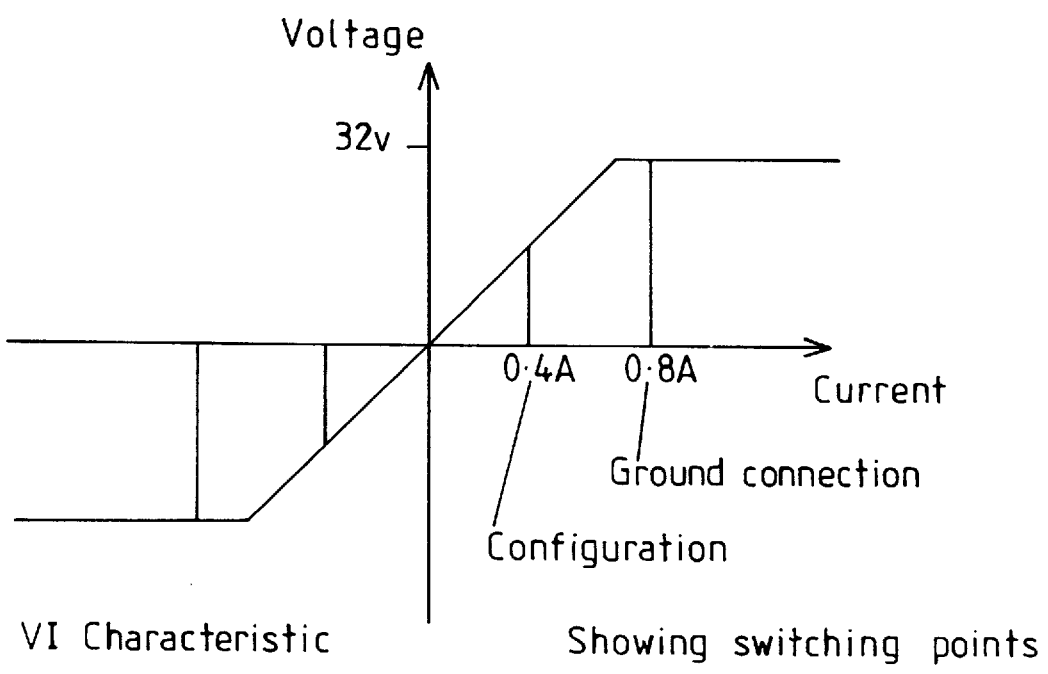
FIG. 2 shows voltage/current characteristic of a switching protocol for the unit of FIG. 1.

In the branching unit of FIG. 1, the A, B and C relays are configured to switch at a trunk line current, e.g. about 400 ma. The grounding relay (the D relay) is arranged to pass current through its coil and is arranged to switch at a higher trunk line current than the A, B and C relays. Typically the D relay switches at a coil current of about 800 ma. The trunk line current can subsequently rise to the full line current of about 1.6 a. Thus the A, B and C relays function as configuration relays and the D relay functions as a current sensing grounding relay. The trunk line current/voltage characteristic illustrated in FIG. 2 shows that ample margin can be achieved between the two switching windows. The coil of the D relay may be provided with zener diode protection.

We have found that the arrangement is tolerant of a single zener diode failure (resulting in a 25% voltage drop), thus providing inbuilt system reliability.

The branching unit of FIG. 1 is fully symmetrical and is intended for use in large multi-spur underwater cable systems.

In the arrangement shown in FIG. 1, predetermined differential voltage is established between two of the three terminations (1, 2, 3). One of the relays (A, B or C) switches at the lower (400 ma) current which corresponds to a predetermined differential voltage between two of the terminations disconnecting the corresponding spur from the trunk line. The spur terminal stations (not shown) thus arrange to discharge the electrically fluctuating spur cable. Continued trunk powering above the higher (800 ma) current threshold allows the disconnected spur to complete the ground connection. Accordingly, system configuration is established without any hot switching under water.

Figure 3:
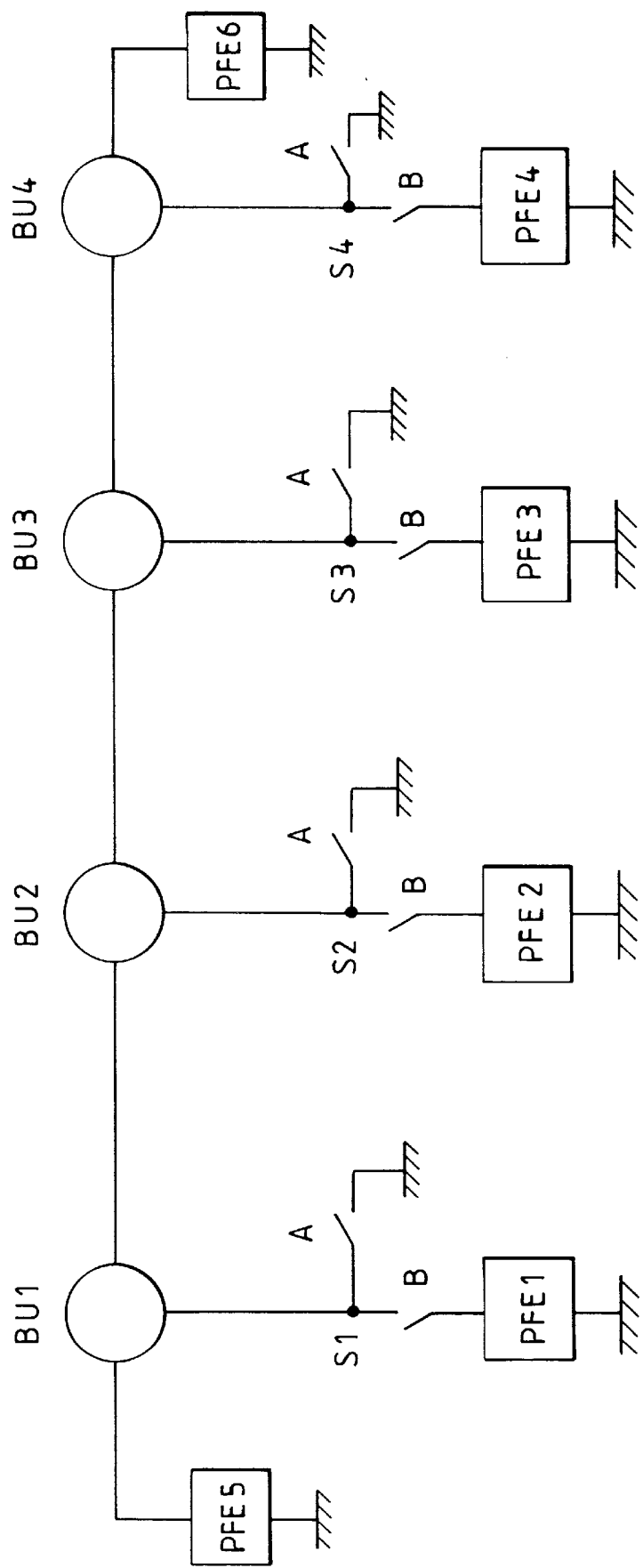
FIG. 3 is a highly schematic diagram of a system incorporating a number of branching units.

Referring now to FIG. 3, this shows a system in which branching units (BU1 to BU4) are powered each from a respective power feed equipment (PFE1 to PFE4) via switches (S1 to S4). Further power feed equipments (PFE5 and PFE6) power the ends of the system.

The system power-up sequence is as follows.

1. Open switches S1 to S4.
2. Ramp PFE5 positive and PFE6 negative.
3. The branching units BU1 to 4 will configure at a current of 400 ma, and the ramping is stopped when a current of 600 ma is reached.
4. The switches S1A to S4A are closed to discharge the spur cables at the cable head, i.e. not under water.
5. Continue ramping PFE5 and PFE6. Earth connection occurs when a current of 800 ma is reached.
6. Once the trunk is powered, close switches S1B to S4B and open switches S1A to S4A.
7. Ramp PFE1 to 4 to the full operating current of 1.6 a. The system is now fully powered.

Figure 4:
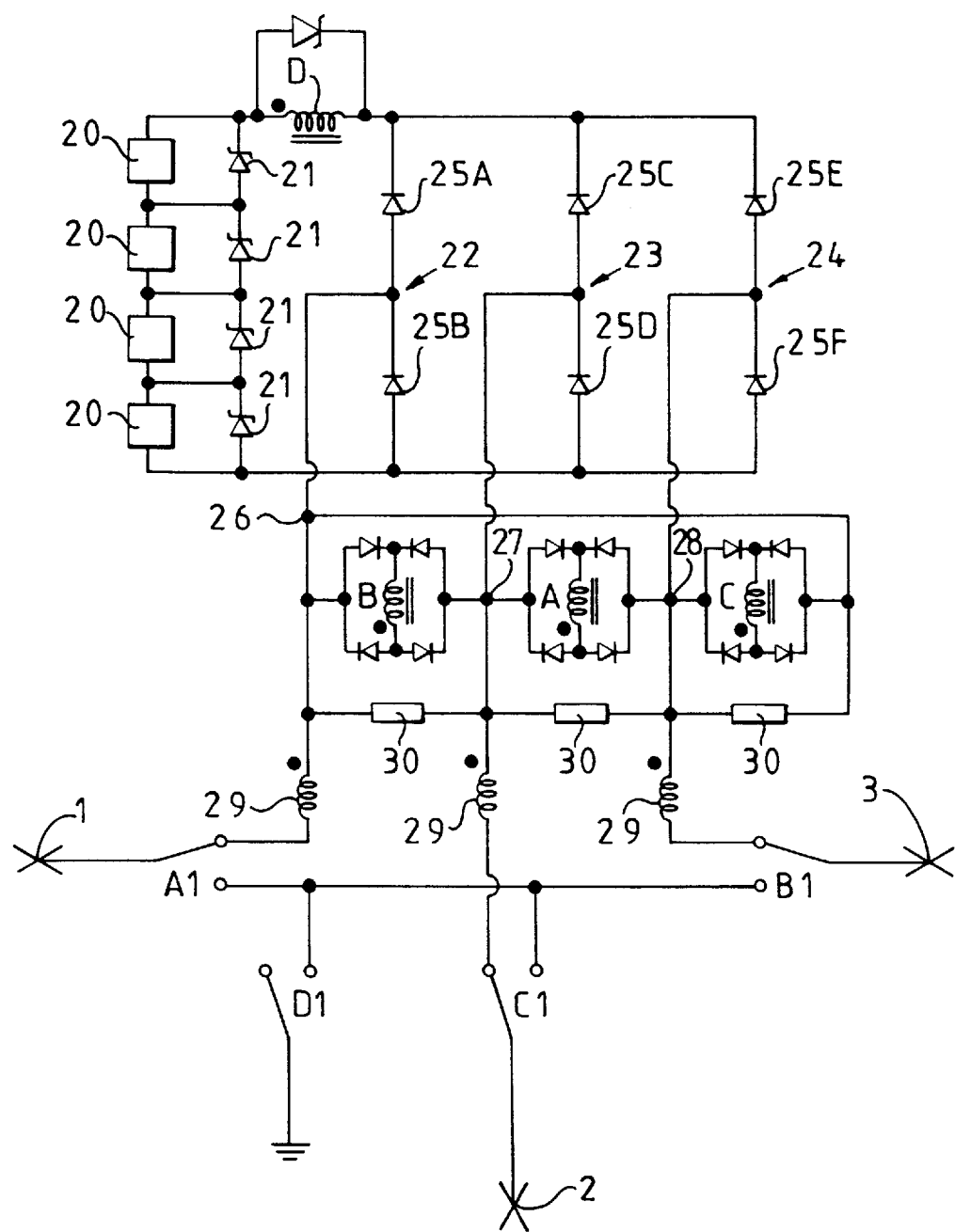
FIG. 4 is a more detailed circuit based on the circuit of FIG. 1.

FIG. 4 shows additional detail of the basic circuit of FIG. 1 and includes three rectifier bridges, one around each of the relay coils A, B, C. These rectifier bridges ensure that no matter which direction current flows (between the terminal) the coil energizing current is always unipolar and helps to increase relay dropout time via the flywheel effect. Under fault conditions, current flow through the branching unit may suddenly reverse as the cable discharges into a short circuit. This reversed process may be quite slow for distant faults, thus there is a time when an actuated relay is starved of current and, furthermore, it must remagnetize with the opposite polarity. In short, the relay may unswitch and connect the spur cable to the main trunk cable causing a high current surge that may damage the relay, depending on the voltage at the time. Additionally the coil bridges act as "flywheels". Removal of current supply will cause a coil to generate a back voltage, the polarity of which is conducted by the bridge diodes. The diode conduction will further prolong the magnetic field decay and thus the dropout time of the relay. This damping effect is sufficient to hold a relay in during the line current reversal and so prevent a grounded spur being connected to the trunk line. Due to the inclusion of the bridge diodes around the relay coils, A, B, C, linearity bypass resisters 30 are included across each of them, since at low supply voltages these bridge diodes will not conduct.

There are four power demand circuits in the form of regenerators 20 in the illustrated arrangement, although this is not the only possibility, with their power feed circuits connected in series. A respective zener diode 21 is connected across (in parallel with) each regenerator 20 and limits supply voltage to the regenerator, the four zener diodes 21 being connected in series. The arrangement of four zener diodes 21 is in effect disposed in parallel with each relay coil A, B and C.

Three pairs, 22, 23 and 24 of rectifier diodes 25A–25F, conducting in the same directions, are disposed in parallel with the series connections of regenerators and zener diodes. One pair of rectifier diodes is associated with each branch cable terminal. The junction 26 to which both coils B and C are connected is connected to a point between the rectifier diodes of pair 22, the junction 27 between coils A and B is connected to a point between the rectifier diodes of pair 23, and the junction 28 to which both coils A and C are connected is connected to a point between the rectifier diodes of pair 24. As will be appreciated, associated with each coil A, B and C, is a respective pair of the pairs of rectifier diodes 22, 23 and 24. For example, coil C is associated with diode pairs 22 and 24, and the four diodes of these two pairs are arranged as a rectifier bridge. The line terminals 1 and 3 and the coil C are connected across one pair of the bridge's terminals and the regenerators 20 and zener diodes 21 are connected across the other pair of the bridge's terminals.

When a voltage is applied between two stations such that, for example, current flows between terminals 1 and 3, terminal 2 is connected to the line A1/B1 and when the current flow through the relay coil D is raised above 800 ma the relay is actuated and the terminal 2 is connected to the sea earth. In addition, current flows from junction 26 through rectifier diode 25A, the series connections of regenerators 20 and zener diodes 21, and rectifier diode 25F to junction 28 and thence to terminal 3.

Hence the regenerator powerfeed circuits are effectively put in series with the leg through which the current is being supplied and in which terminals (1 and 3 in this example) are connected and hence current is always supplied to the regenerators. If current flow is between terminals 1 and 2 and terminal 3 is connected to the sea earth when contacts D1 are changed over, current flows through rectifier diode 25A, the regenerators 20 and zener diodes 21 and rectifier diode 25D to junction 27 and thence to terminal 2. If terminals 2 and 3 are connected and terminal 1 is connected to the sea earth when contacts D1 are changed over and current flow is from terminal 2 to terminal 3, it also flows from junction 27 through rectifier diode 25C, the regenerators 20 and zener diodes 21 and rectifier diode 25F to junction 28. If the current flow is reversed e.g. with the last case, but flow is from terminal 3 to terminal 2, current flows from junction 28, through rectifier diode 25E, the regenerators 20 and the zener diodes 21, rectifier diode 25D to junction 27 and thence to terminal 2. The arrangement is symmetrical and reversible and achieves the requirement of supplying current to the regenerators irrespective of which two terminals (arms or branches of the system) are powered and irrespective of the current flow direction.

Considering current applied between terminals 1 and 3, relay coil C sees double the voltage of the coils A and B, which means that the C relay is capable of switching its contacts C1, but the A and B relays are not capable of switching their contracts A1 and B1 as they only have half of the voltage. The four zener diodes 21 simultaneously offer surge protection to the regenerators 20, relay coils A, B, C and the rectifier diodes, i.e. protection during current transients. These may occur such as when the cable is cut, it shorts out to the seawater and very large currents (300–400 amps) can flow. So by having the zener diodes 21 in parallel with the regenerators 20 they limit the voltage across the regenerators 20, as well as across the relay coils A, B, C. So the system is totally internally surge protected. In addition, surge protection coils 29 are included between the terminals 1, 2, 3 and the junctions 26, 27, 28 to lengthen the rise time in the event of a nearby short circuit fault and to provide a smaller transient over a longer time than otherwise. The surge protection coils 29 thus limit inductive voltage spikes between regenerators 20 and across the rectifier diodes 21 and relay coils A, B, C during current transients.

For cable fault finding purposes at low line currents, it is necessary to have a dc path with defined resistance. The resistors 30 provide such a path since at low power feed voltages, the rectifier bridge will not conduct significantly.

Illustrated in FIG. 4 between the sea earth and the contacts A1, B1 and C1 is the further relay contact D1 referred to above, associated with further relay coil D. The D relay isolates the spur from ground until it has been discharged by the terminal station.

The present invention allows the provision of:

1). A Branching Unit to allow the powering of a multi-spur system, without hot-switching of vacuum relays during power-up, thus preventing 'Arc-Transfer'.
2). A Branching Unit that has a defined two stage switching process controlled by the system line current flowing through the unit.
3). A Branching Unit that will allow the flow of current through any two spurs, automatically connecting the third to a Sea Earth once fully powered.
4). A Branching Unit that is insensitive to current direction for correct operation.
5). A Branching Unit that is tolerant of zener diode component failure by short circuit.

What is claimed is:

1. A branching unit for an underwater communications system, the unit providing remote hot switching for electrical power, comprising at least three terminations each for a different one of at least three line cables, one or more power demand circuits requiring an electrical power feed from the line cables a first switching circuit actuable based upon relative line cable voltage so as to complete a current path between an appropriate pair of the at least three terminations via said one or more power demand circuits, and a second switching means actuable after actuation of said first switching circuit based upon current supplied to the power demand circuit(s) rising above that which occurs upon actuation of said first switching circuit and effective to complete a circuit between the non-paired termination(s) and a fourth termination for a sea earth.

2. A branching unit as claimed in claim 1, wherein said first switching circuit comprises at least three electrical relays each having a coil and a normally closed pair of contracts arranged in series and forming one side of a delta network, each side of the delta network being connected between a different pair of the at least three terminations, each relay also having a pair of change-over contacts which normally connect a different one of the terminations to the delta network but which when actuated permit connection of the terminations to the fourth termination via the second switching means.

3. A branching circuit as claimed in claim 2, wherein the second switching means comprises a relay having a coil which is connected in series with the power demand circuit (s).

4. A branching unit as claimed in claim 3, wherein the coils of the first switching circuit are connected between a respective pair of the line cable terminations via rectifier diodes.

5. A branching unit as claimed in claim 4, including a series connection of at least one zener diode, each relay coil being disposed in parallel with the at least one zener diode.

6. A branching unit as claimed in claim 5, including at least three pairs of series connected rectifier diodes, each pair being associated with a respective line cable termination, disposed in parallel with the at least one zener diode and the power demand circuit(s), wherein each line cable termination is connectible to a point between the two rectifier diodes of the respective pair, each coil of the first switching circuit being connected across a respective pair of said points, the four rectifier diodes associated with each said coil of the first switching circuit being arranged as a rectifier bridge, and wherein the at least one zener diode provides surge protection for the power demand circuits, the coils of the first switching circuit and the rectifier diodes simultaneously.

7. A branching unit as claimed in claim 6, wherein between each line cable termination and the respective point is disposed a respective surge protection coil.

8. A branching unit as claimed in claim 7, wherein the relay coils of the first switching circuit each have associated therewith a respective rectifier bridge to prevent a line current reversal unlatching an actuated relay and causing an electrical surge at the relay contacts.

9. An underwater communication system incorporating one or more switching units and shore stations associated therewith and having means provided for performing hot switching within the shore stations.

10. A branching unit as claimed in claim 2, wherein the coils of the first switching circuit are connected between a respective pair of the line cable terminations via rectifier diodes.

11. A branching unit as claimed in claim 2, including a series connection of at least one zener diode, each coil of the first switching circuit being disposed in parallel with the at least one zener diode.

12. A branching unit as claimed in claim 2, wherein the coils of the first switching circuit each have associated therewith a respective rectifier bridge to prevent a line current reversal unlatching an actuated relay and causing an electrical surge at the relay contacts.

* * * * *